(12) United States Patent
Friberg et al.

(10) Patent No.: US 6,738,140 B2
(45) Date of Patent: May 18, 2004

(54) WAVELENGTH DETECTOR AND METHOD OF DETECTING WAVELENGTH OF AN OPTICAL SIGNAL

(75) Inventors: Stephen R. Friberg, Mountain View, CA (US); Charles C. Harb, Sunnyvale, CA (US)

(73) Assignee: Lambda Control, Inc., Sunnyvale, CA (US)

( * ) Notice: Subject to any disclaimer, the term of this patent is extended or adjusted under 35 U.S.C. 154(b) by 0 days.

(21) Appl. No.: 09/954,086

(22) Filed: Sep. 17, 2001

(65) Prior Publication Data

US 2002/0093657 A1 Jul. 18, 2002

Related U.S. Application Data

(60) Provisional application No. 60/233,836, filed on Sep. 19, 2000.

(51) Int. Cl.[7] ............................................. G01N 21/25
(52) U.S. Cl. ..................... 356/419; 356/416; 250/226
(58) Field of Search .................................. 356/419, 416, 356/402; 372/32; 250/226

(56) References Cited

U.S. PATENT DOCUMENTS

| | | | |
|---|---|---|---|
| 4,309,604 A | * | 1/1982 | Yoshikawa et al. ......... 250/226 |
| 4,692,025 A | * | 9/1987 | Tani et al. ..................... 356/45 |
| 4,904,088 A | * | 2/1990 | Blazek et al. ................ 356/402 |
| 4,906,836 A | * | 3/1990 | Yamashita et al. .......... 250/226 |
| 5,515,169 A | * | 5/1996 | Cargill et al. ................ 356/417 |
| 5,706,301 A | | 1/1998 | Lagerström |
| 5,729,347 A | | 3/1998 | So |
| 5,760,419 A | | 6/1998 | Nabiev et al. |
| 5,777,763 A | | 7/1998 | Tomlinson, III |
| 5,798,859 A | | 8/1998 | Colbourne et al. |
| 5,825,792 A | | 10/1998 | Villeneuve et al. |
| 5,850,292 A | | 12/1998 | Braun |
| 5,963,686 A | | 10/1999 | Zheng et al. |
| 6,005,995 A | | 12/1999 | Chen et al. |
| 6,088,142 A | | 7/2000 | Cao et al. |
| 6,094,271 A | | 7/2000 | Maeda |
| 6,122,301 A | | 9/2000 | Tei et al. |
| 6,178,002 B1 | | 1/2001 | Mueller-Wirts |
| 6,212,210 B1 | | 4/2001 | Serizawa |
| 6,215,801 B1 | | 4/2001 | Ackerman et al. |
| 6,233,263 B1 | * | 5/2001 | Chang-Hasnain et al. .... 372/32 |
| 6,243,403 B1 | | 6/2001 | Broutin et al. |

* cited by examiner

Primary Examiner—Frank G. Font
Assistant Examiner—Roy M. Punnoose
(74) Attorney, Agent, or Firm—Dorsey & Whitney LLP (57) ABSTRACT

A wavelength detector is described. The wavelength detector directs an incoming optical signal into two paths, at least one of which varies with wavelength of the optical signal. The light in the two paths is detected by a photodetector and the output electrical signals are log amplified. The log amplified signals are applied to a difference amplifier whose output is indicative of the wavelength of the incident optical signal.

15 Claims, 6 Drawing Sheets

Figur 9

WAVELENGTH DETECTOR AND METHOD OF DETECTING WAVELENGTH OF AN OPTICAL SIGNAL

RELATED APPLICATIONS

This application claims priority to Provisional Application Serial No. 60/233,836 filed Sep. 19, 2000.

FIELD OF THE INVENTION

This invention relates generally to a wavelength detector that can be used to measure the wavelength of a monochromatic optical signal. Specifically, it provides an electrical output signal that is a measure of the wavelength of the input optical signal. This invention can be used in the fields of optics, telecommunications, and laser spectroscopy, and in particular to a composite optical and analog electronic system for determining the wavelength of a laser or a light source.

BACKGROUND OF THE INVENTION

Wavelength measurement devices that are used to, detect, monitor and control a laser's wavelength are emerging as integral components of laser optical systems. There are growing demands for wavelength measurement devices because the telecommunications, spectroscopic, and analytical chemistry industries have grown to the point where accurate wavelength measurement and management are major requirement. The development of dense wavelength division multiplexing (DWDM) systems in telecommunications and high sensitivity spectroscopic systems in analytical chemistry has led to a demand for wavelength measurement and control systems that are fast, accurate, give real time wavelength readouts, and are inexpensive.

In optical telecommunications systems, for example, the laser light sources have to be held to a wavelength that moves by less than 1 GHz if they are to operate in DWDM systems that have wavelength spacings of 100 GHz or less. This process is achieved using a wavelength measurement device that samples the output of a laser and provides a signal that can be used to adjust the laser's wavelength to the correct value and limit its deviation from that value. Additionally, wavelength measurement devices are used to accurately switch the laser wavelength from one telecommunications channel (ITU channel) to another. Rapid and accurate wavelength switching (microseconds to nanosecond switching times) over a wide wavelength range (40 nm at 1550 nm) is emerging as a new, and essential requirement for DWDM systems.

In spectroscopy and analytical chemistry, concentrations of chemical constituents or molecular and atomic components can be easily and inexpensively measured with tunable diode lasers provided there exists an accurate and reasonably rapid means to tune the laser to the required wavelength.

Historically, wavelength measurements have been performed in several ways.

1. A prism or diffraction grating is used to disperse different wavelengths into different directions, each direction corresponding to a unique wavelength. By scanning the directions with a slit and a detector sensitive to light intensity, the wavelength properties of an optical signal can be determined.

2. Alternatively, a scanning optical interferometer can be employed, typically a Michelson interferometer. The wavelength of an optical signal is determined by changing the length of the interferometer, by a known amount, and counting the number of interference fringes (a narrow bandwidth optical signal is assumed).

To determine the wavelength of an optical signal with very high accuracy, these measurement techniques have to be augmented by a calibration measurement:

A. The unknown wavelength is compared to a spectroscopic signal; or

B. The unknown wavelength is compared to stabilized laser signal.

Both measurement methods required mechanical movement—and therefore considerable time—for the measurement to be performed, typically on the order of seconds. Also, due to requirements for stable mechanical accuracies at micron dimensions, expensive and bulky mechanical components are required. With accurate calibration, great accuracies can be achieved with these techniques, better than $1*10^{-13}$ meter resolution, however the time to take the measurements limited their usage in many applications. The need for mechanical stability and repeatability, combined with the complexity of calibration measurements, ensures that the measurement devices were bulky and costly, restricting their usage.

Figure 1:
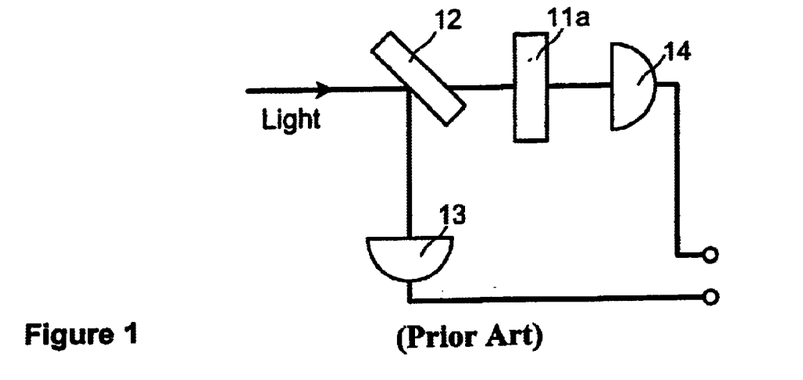
FIG. 1 is a schematic diagram of a prior art apparatus for measuring the wavelength of an optical signal.
Figure 2:
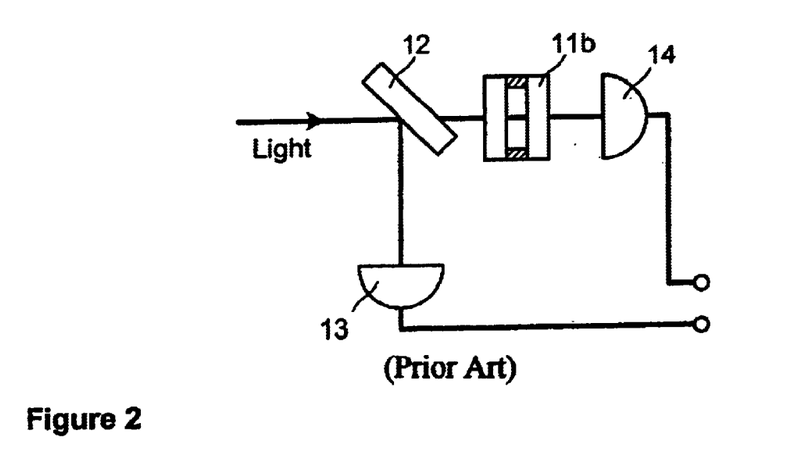
FIG. 2 is a schematic diagram of another prior art apparatus for measuring the wavelength of an optical signal.

Methods have been developed that partially solve some of these problems. If measurements are to be performed on a monochromatic signal (i.e., one where the bandwidth is very small compared to the center frequency) at a specific wavelength, a dielectric bandpass filter or a Fabry-Perot etalon can be used in place of a wavelength reference. When an optical signal is incident on a dielectric filter or a Fabry-Perot etalon at or near a resonance, transmission through (or reflection from) the filter or etalon is determined by the wavelength of the optical signal and the resonant characteristics of the dielectric filter 11a or etalon 11b, FIGS. 1 and 2. The light beam is applied to a beamsplitter 12. Light from the beamsplitter is applied directly to photodiode 13 and to a second photodiode 14 after it has been transmitted (or reflected) by the filter 11. The outputs of the photodiodes are then compared. The use of a beamsplitter and photodiodes eliminates any error due to changes in beam intensity. A measurement of the transmission (or reflection) therefore determines the wavelength of the light, except that the same transmission (or reflection) can correspond to different wavelengths. When the wavelength of the source is approximately known, as is sometimes the case, this is not a problem. More generally, it means that the wavelength has been determined to be one of several values. For the case of a dielectric bandpass filter with a single transmission peak, the wavelength is determined to be one of two values. In the case of a Fabry-Perot etalon with multiple resonances, the wavelength can be one of multiple values.

These methods make possible wavelength locking of a monochromatic laser light source to a desired wavelength. When the wavelength of the source differs from the desired wavelength, that selected by the filter or etalon, the transmission of the light through the filter or etalon differs from the desired transmission as determined by the output of the two photodiodes. The difference is used to provide an error correction signal that can be used to adjust the wavelength of the laser source to the correct value.

If a bandpass dielectric filter is used for wavelength measurement or wavelength locking, the disadvantage is that it works over a limited wavelength range (typically <2 nm). This means that it cannot be used for applications such a tunable telecommunications lasers where wide wavelength tunability is an important requirement. It also has the disadvantage that the wavelength resolution is dependent on the quality of the thin film coating, which often has ripple or etalon effects that limit the accuracy with which the transmission can be measured.

If a Fabry-Perot etalon is used for wavelength measurement or wavelength locking, it allows wavelength measurement and wavelength locking at a number of different wavelengths corresponding to different resonances of the Fabry-Perot. A disadvantage is that measurement accuracies are restricted by mechanical and thermal stability. Another disadvantage is that Fabry-Perot etalon have multiple resonant transmission peaks and therefore multiple wavelengths that give the same transmission. Thus, the absolute wavelength of the measurement cannot be determined. An additional disadvantage is that the measurement accuracy obtainable with an etalon is very poor at wavelengths situated halfway between its resonances. For telecommunications systems, Fabry-Perot etalon dimensions are inversely proportional to channel spacings. Thus, as channel spacings switch from 100 GHz to 50 GHz to 25 GHz, etc, etalon sizes must double and then quadruple, meaning that they grow larger and larger.

OBJECTS AND ADVANTAGES OF THE INVENTION

It is an object of the present invention to provide an apparatus and method that overcomes many of the foregoing problems. Advantages of the present invention are that the wavelength readout signal is monotonically related to the wavelength of the incident beam over ranges that can be in excess of 40 nm, is stable to better than ±7 pm over this range, and with minor improvements could reach <±3 pm without altering the optical path length, and the speed at which wavelengths are read is only limited to the speed of the photodetection system.

Other objects and advantages of the present invention are:

a) to provide an apparatus and method measuring the wavelength of light which is inexpensive, (b) to provide apparatus for measuring the wavelength of light that can be readily miniaturized, (c) to establish the wavelength of light without having to know the approximate wavelength in advance, (d) to provide a feedback signal that can be used to lock the wavelength output of an optical light source such as a single-mode laser or optical parametric oscillator, (e) to provide an inexpensive means for measuring the wavelength of optical signals from spectroscopic sources used in environmental and chemical analysis, and (f) to provide a means for measuring the wavelength fluctuations of a light source.

SUMMARY OF THE INVENTION

The objectives and advantages of the invention are achieved by an optical system that directs the laser light into two predetermined paths in at least one of which the intensity varies with wavelength. The light in each of the paths is detected by a photodetector which provides photo-currents which are received by log amplifiers which provide the logarithm of the two photo-current intensities. A subtractor receives the log outputs and provides a signal indicative of wavelength.

More particularly, the apparatus includes an optical system comprising an optical beamsplitter that divides the incident laser beam into two beams having approximately half the incident power in each; one spectral filter, or mirror, that acts to reflect the longer laser wavelengths more strongly than the shorter wavelengths; one spectral filter, or mirror, that acts to reflect the shorter laser wavelengths more strongly than the longer wavelengths; photodetectors to capture the light from the two spectral filters and generate photo-currents; log-amplifiers for receiving said photo-currents and providing the logarithm of the two photo-currents; and a subtractor for subtracting the logarithm of the two photo-currents and provide an output signal indicative of wavelength.

The analog electronic system may be comprised of one photodetector preamplifier for each of the photodetectors; one logarithmic amplifier for each of the photodetected signals; and a difference amplifier for subtracting the two logarithmic signals.

DESCRIPTION OF THE FIGURES

The present invention will be better understood by reading the following detailed description in conjunction with the accompanying drawings in which:

FIG. 9 is a three-dimensional representation of the apparatus of FIG. 8.

DETAILED DESCRIPTION

Figure 3:
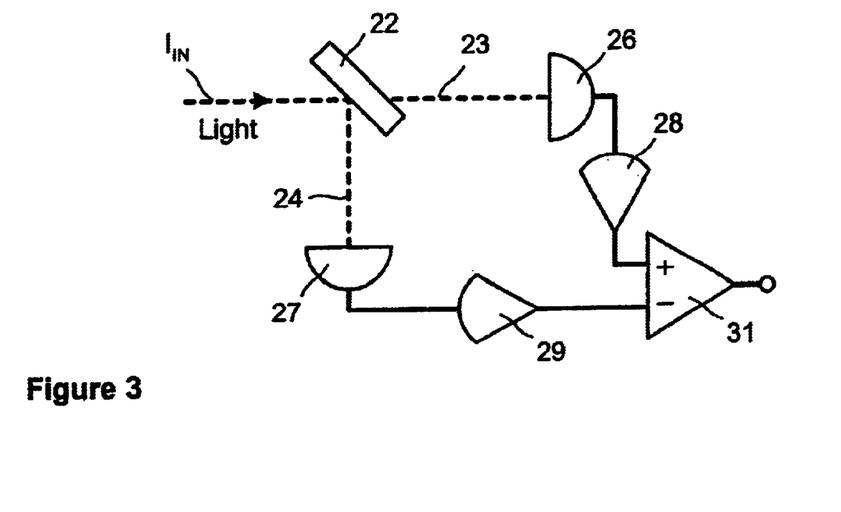
FIG. 3 is a schematic diagram of a detector for measuring the wavelength of an optical signal or beam in accordance with an embodiment of the invention.

FIG. 3 shows the basic optical and electrical components of a wavelength detector in accordance with one embodiment of the present invention. The detector is positioned to receive an optical signal (beam) $I_{in}$. The detector includes a beamsplitter 22 whose transmission varies with wavelength to form two beams 23 and 24. The beams are received by photodetectors 28 and 29. Analog log-amplifier circuits 26 and 27 receive the output of the photodetectors and provide the log of the current received from the photodetectors. The two log outputs are subtracted by subtractor or difference amplifier 31 to provide a signal representative of wavelength of optical signal. This signal can then be used with a look-up table or the like to provide a measurement of wavelength.

Figure 4:
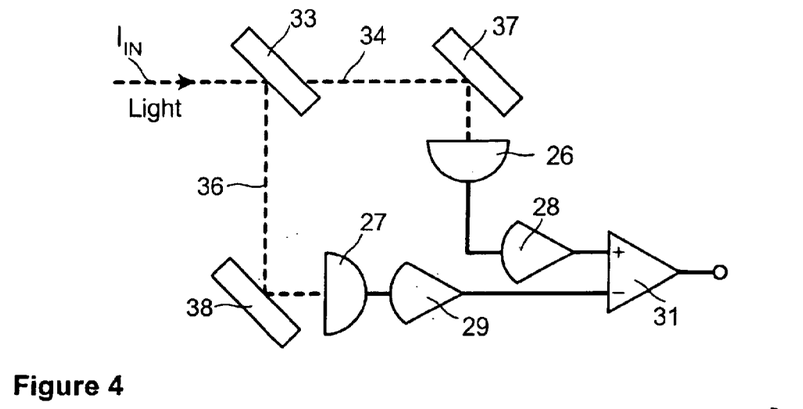
FIG. 4 is a schematic diagram of a detector for measuring the wavelength of an optical signal or beam in accordance with another embodiment of the invention.

FIG. 4 illustrates another embodiment of the invention where like parts have been given like reference numbers. In this embodiment, the beamsplitter 33 merely splits the input beam $I_{in}$ into two beams 34 and 36. The beams then impinge upon filters 37 and 38 which are low-wavelength pass (LWP) and long-wavelength pass (SWP) filters which have transmission characteristics which vary with wavelength. The same results can be achieved by filters which reflect low and long wavelength light. The photodetectors and analog circuits are the same as described above with reference to FIG. 3 and bear the same reference numbers.

If we assume that the laser beam, $I_{in}$, is split into two fields or beams 34 and 36, these beams have intensities $(1-\eta)*I_{in}$ and $\eta*I_{in}$, where $\eta$ is the splitting ratio and is approximately equal to 0.5, and each beam is modified by the appropriate spectral filters 37, 38, then the resulting photo-currents are:

$$I_1 = I_{in}(1-\eta)F_1 \quad (1)$$

$$I_2 = I_{in}\eta F_2 \quad (2)$$

where $I_1$ and $I_2$ are the intensity of the output from the photodiodes 26 and 27.

Each of the two photo-currents are amplified and then converted to a logarithm by a logarithmic amplifiers 28, 29. The resulting voltages are then subtracted in subtractor 31.

$$I_{wd} = \ln[I_{in}(1-\eta)F_1] - \ln[I_{in}\eta F_2] \quad (3)$$
$$= \ln[(1-\eta)F_1] - \ln[\eta F_2]$$
$$= \ln\left[\frac{(1-\eta)}{\eta}\right] - \ln\left[\frac{F_1}{F_2}\right]$$

The output current $I_{wd}$ is indicative of wavelength.

Note that the signal $I_{wd}$ is independent of the laser intensity $I_{in}$. Also, $I_{wd}$ is dependent on the beamsplitter ratio, $\eta$, as well as the spectral filters F1 and F2. Thus, if any of these components vary in magnitude as a function of wavelength the output signal is indicative of wavelength.

If we assume that F1=F2=1, then we have the special case where the $I_{wd}$ is only dependent on $\eta$. We can create a wavelength detector by making $\eta$ a function of wavelength, FIG. 3. The simplest case would be if, $$\eta(\lambda) = m\lambda + b \quad (4)$$

Where m and b are suitable constants that make h a value between 0 and 1 in the wavelength range of interest. For example if h varies linearly with wavelength, and h=0 at 1525 nm and h=at 1575 nm then m=0.02 and b=30.5, and we find that, $$I_{wd}(\lambda) = \ln\left[\frac{(1-(0.02\lambda-30.5))}{(0.02\lambda-30.5)}\right] \quad (5)$$

Figure 5:
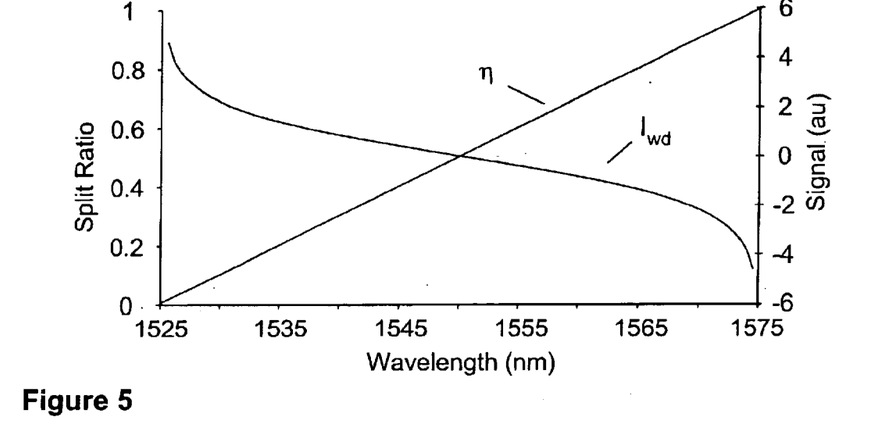
FIG. 5 shows the output signal of the detector as a function of wavelength for an apparatus employing a beamsplitter whose transmission varies linearly with wavelength.

The linear variation of $\eta$ and resulting wavelength detector signal $I_{wd}$ can be seen in FIG. 5. The wavelength detector signal is a curve that varies monotonically with wavelength, however it does not produce a linearly response over the useable wavelength range. The range can be improved by tailoring $\eta(1)$ such that $I_{wd}$ is linear over a longer range.

Figure 6:
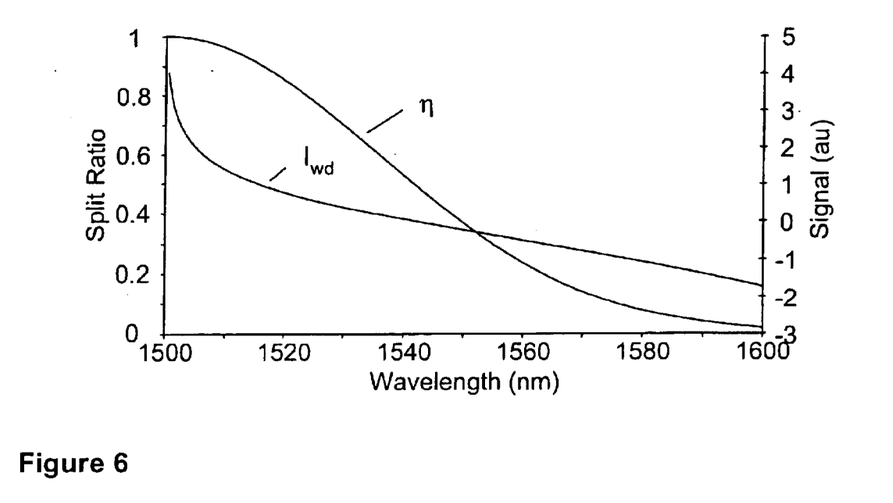
FIG. 6 shows the output signal of the detector as a function of wavelength for an apparatus employing a beamsplitter whose transmission varies in a Gaussian manner with wavelength.

A more standard coating would be a Gaussian shape. FIG. 6 shows $I_{wd}$ using a beamsplitter that is varying its split ration in a Gaussian manner. Note that the linearity of wavelength detector signal is improved at one end of the wavelength scale, but not at the other.

Figure 7:
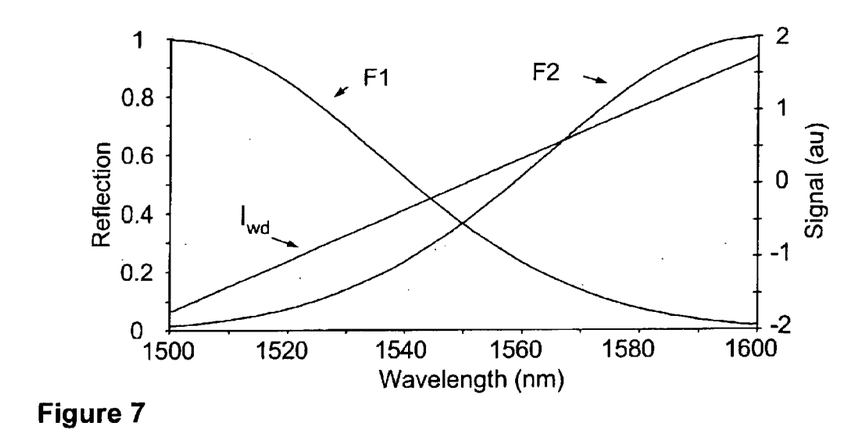
FIG. 7 shows the output signal of the detector of FIG. 6 when employing filters or reflectors whose transmittance or reflectance varies in a Gaussian manner with wavelength.

Alternatively, the beamsplitter ratio can be left constant and we can chose to vary the reflectance of the filters in the system. Once again the simplest coating would be a Gaussian variation with wavelength. We can consider the case where 37 reflects the shorter wavelengths more strongly than the longer wavelengths, and 38 reflects the longer wavelengths more strongly than the shorter wavelengths. FIG. 7 shows the resulting wavelength detector signal $I_{wd}$ for this situation. Under these conditions the signal is linear over the usable range of the filters. Thus, this system maximizes the useable range of the detector.

Figure 8:
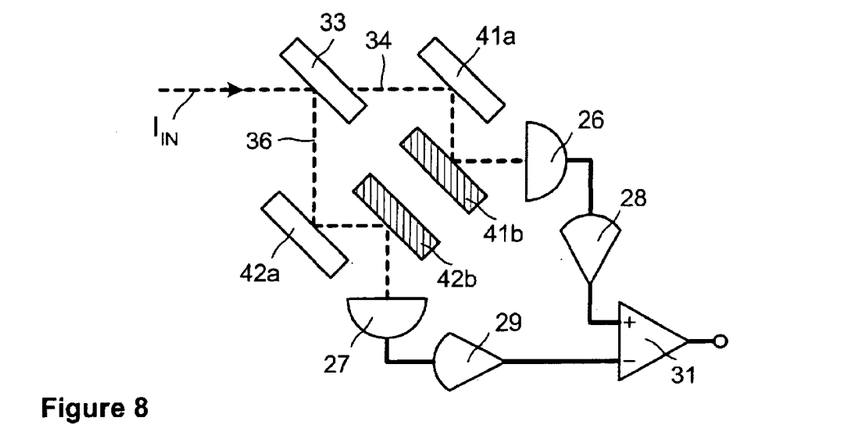
FIG. 8 is a schematic diagram of a polarization-insensitive wavelength detector.

FIG. 8 shows a polarization insensitive wavelength detector using long and short wave pass filters 41a, 41b and 42a, 42b in tandem operating in planes perpendicular to each other. FIG. 9 is a three-dimensional schematic of the optical arrangement. In other respects, the detector operates as described with reference to FIG. 4, and the same reference numbers have been applied to like parts. Light $I_{in}$ from a laser or other light source whose wavelength is to be measured does not arrive with a fixed polarization. Rather, it may be linearly polarized at any angle, or elliptically polarized. If the wavelength detector does not make polarization-independent measurements, than different polarization states will give different measurement results, causing measurement errors. To compensate for filter polarization dependence, the filters 41a, 41b and 42a are rotated in the plane with respect to each other so that the two planes are defined for the incoming beam and the reflections are perpendicular. This means that polarized light that is s-polarized light (electric fields parallel to the surface) with respect to 41a or 42a, is p-polarized with respect to the 41b or 42b, and vice-versa. Each polarization component of the light signal to be measured experiences identical s-polarized reflection and a p-polarized reflection, albeit in different order, so the light reflected from the filters 41a, 41b or 42a, 42b experiences no polarization change. Therefore, there is no polarization dependence of the wavesensor's operation.

Figure 10:
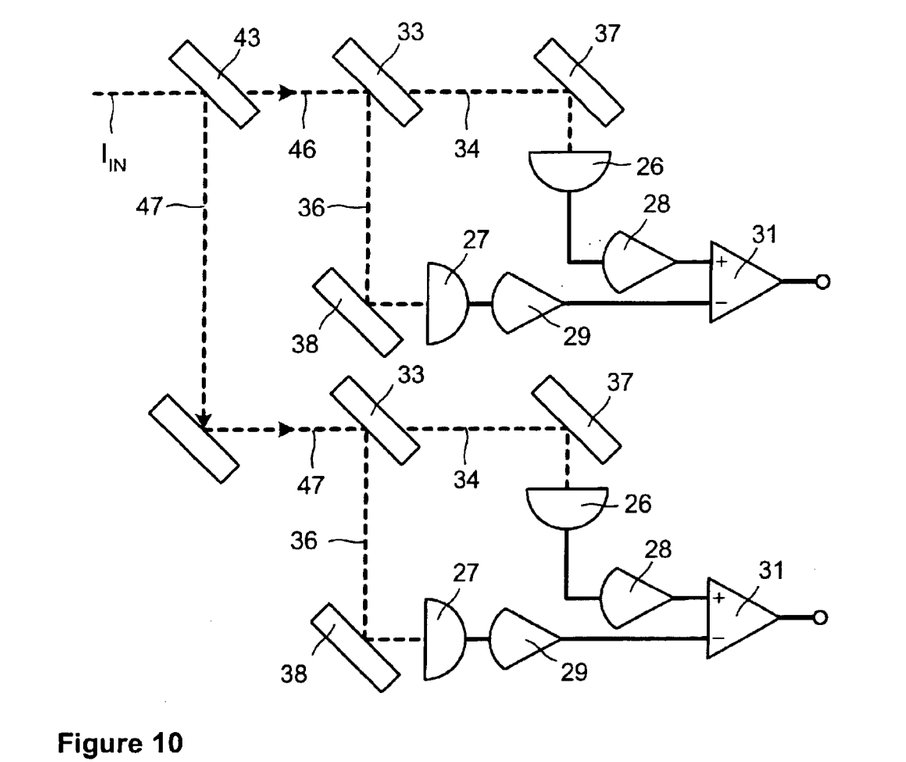
FIG. 10 is a schematic diagram of another polarization insensitive wavelength detector.

Another polarization-insensitive detector is shown in FIG. 10. In this embodiment, two separate measurements are made of the wavelength of the incoming light beam, one for each incoming polarization, so that the wavelength is measured correctly regardless of the incoming polarization. Each wavelength detector operates as described with reference to FIG. 4 and may be polarization dependent. A beamsplitter 43 splits the incoming beam to be measured into two perpendicular polarizations 46, 47 so that each of the two measurements is for a known and fixed polarization. The optical configuration and analog circuits described in FIG. 4 are used for each polarization; like reference numbers have been added to like parts.

Figure 11:
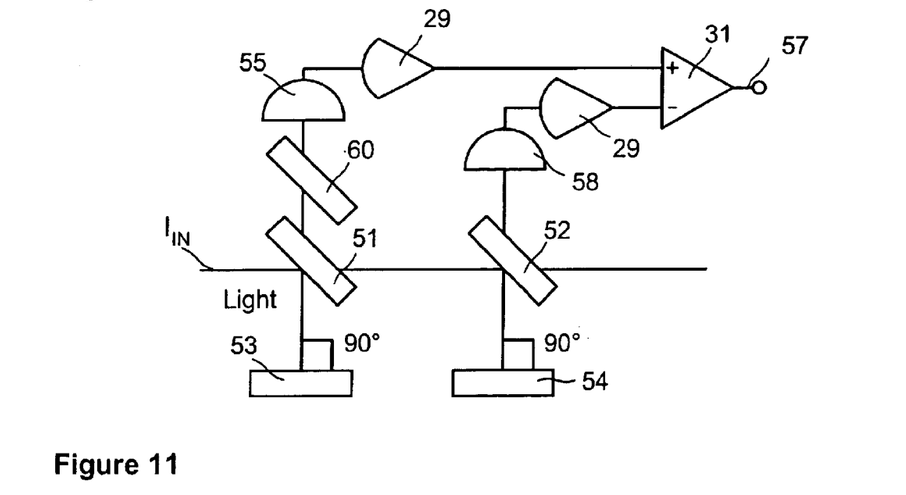
FIG. 11 is a schematic diagram of still another polarization insensitive wavelength detector.

Another polarization-insensitive wavelength detector is illustrated in FIG. 11. The detector uses low reflectivity beamsplitters 51, 52 and 60, and short-wavelength and long-wavelength filters 53 and 54 positioned to operate at normal or near-normal incidence (i.e., perpendicular to the surface of the beamsplitters).

The beamsplitters 51 and 52 each take part of the light to be measured and reflect it to filters 53 and 54 which retro-reflect the light back along its path (or nearly so) so that it is transmitted through the beamsplitters 51 and 60 to fall on photodiode 55 and through beamsplitter 52 to fall on photodiode 56. Signals from the photodiodes in the two arms go to log amplifiers 56 and 57 whose outputs go to the subtractor circuit 31. Light falling normally on an optical interference coating comprising the reflective surface of filter 53 or filter 54 has equal reflectance for all polarization states. Polarization sensitivities of filters 53 and 54 are thereby eliminated or nearly eliminated. Any effect on the polarization of the signal to be measured is made identical in the short-wavelength and long-wavelength arms of the detector by making beamsplitter 60 identical to beamsplitters 51 or 52. Then, the signal reflects from the front surface of beamsplitter 51, reflects from the filter 53, is transmitted through the front surface of beamsplitter 51, the back surface of beamsplitter 51, the front surface of beamsplitter 60, and the back surface of beamsplitter 60 before arriving at the photodiode 55. A signal goes through the front surface of a beamsplitter 51, the back surface of beamsplitter 51, reflects from the front surface of a beamsplitter 52, reflects from filter 54, and then is transmitted through the front and back surface of beamsplitter 52 before arriving at photodiode 56. Although the order is different, the transmissions and reflections (including the SWP and LWP filters at normal incidence) are identical. Because signals going down both paths experience the same effects, polarization effects are identical, and are thus rejected by the subtraction circuit.

If beamsplitters 51 and 52 have low reflectivities, i.e., in the 1% to 5% range, and the polarization sensitivity is small, i.e. s- and p-polarized reflections are nearly equal, then beamsplitter 60 can be eliminated. Then, both photodiodes see signals with nearly identical polarization-induced effects since the effect of beamsplitter 51 on the polarization of light transmitted through it is very small.

Figure 12:
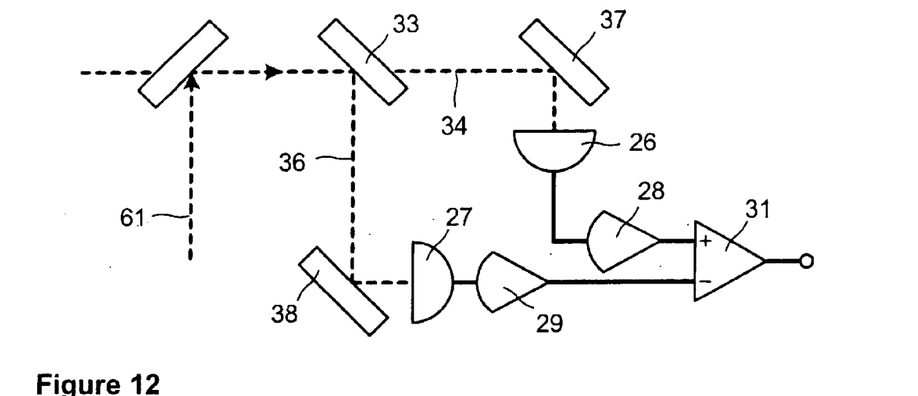
FIG. 12 is a schematic diagram of an optical apparatus for introducing a reference signal for calibrating wavelength detectors.

The wavelength detector can be calibrated by introducing a reference signal having a known wavelength. FIG. 12 shows a reference signal 61 applied to the wavelength detector of FIG. 4 wherein like parts have like reference numbers.

Figure 13:
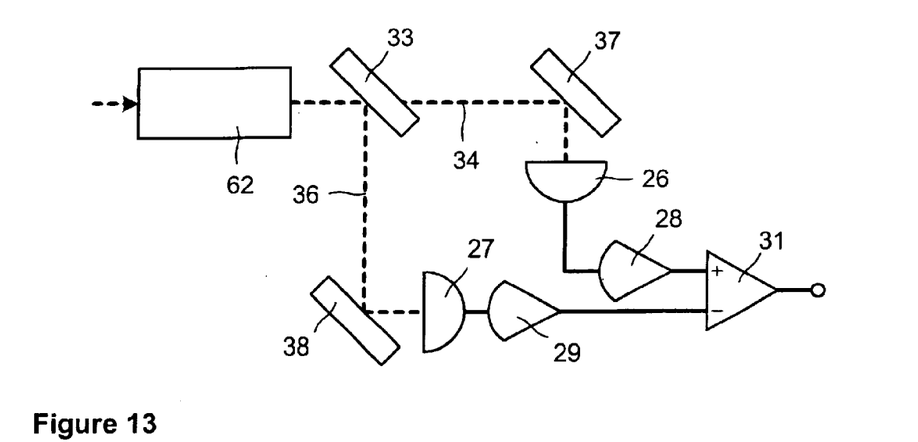
FIG. 13 is a schematic diagram of a spectrum analyzer using a tunable wavelength optical filter and a wavelength detector in accordance with the operation of the present invention.

The wavelength detector can be used with a narrow band tunable optical filter 62 as an optical spectrum analyzer. The wavelength detector, FIG. 13, is shown receiving the output from a swept tunable narrow band optical filter 62. This eliminates the need for precise knowledge of the center wavelength of the tunable optical filter.

Usually, the optical spectrum analyzers use moving diffraction gratings and fixed slits, or moving optical slits and fixed diffraction gratings, as narrow-band tunable optical filters. Scanning such filters is slow because they require mechanical movement and accurate mechanical measurement of position to determine their operating wavelength. They are also bulky, heavy and expensive, especially if high accuracy is needed. Using a wavelength detector with a narrow-band swept tunable optical filter eliminates he need to accurately measure the filter center wavelength because the wavelength of the light going through the filter can be determined by the wavelength detector. This allows scanning of the optical filter to be done independently of determining its center wavelength, allowing the use of a wide variety of filters, some of which can be tuned very rapidly.

The combination of the narrow-band swept optical filter and the wavelength detector thus allows the construction of inexpensive, fast and highly versatile optical spectrum analyzers that can be very compact.

One spectrum analyzer using the wavelength detector of the present invention is illustrated in FIG. 13. Light from a signal to be detected—non-monochromatic or monochromatic—is directed through a narrow-band swept tunable filter 62. The filter transmits a portion of the incoming light determined by the frequency to which it is tuned. This portion is assumed to be narrow-band—i.e., much narrower in wavelength than the bandwidth of the wavelength detector range. The wavelength detector determines the wavelength and the intensity of the signal transmitted to it through the narrow-band filter. When the filter is swept across the wavelength range to be measured, it provides a measurement of the signal's optical spectrum.

Because the wavelength detector is making the wavelength measurement, not the filter, the filter can be swept very quickly, making the optical spectrum analyzer very useful when fast scans are needed. If the filter sweeping mechanism is electrical, scans can be performed in microseconds or less. If MEMS or piezo technology is used, scans can be performed in milliseconds or faster. This is much faster than current typical measurement devices, which can not scan much faster than 0.1 second or so, with one second scans or slower being more typical. Also, because the wavelength detector is making the wavelength measurement, the device can be extremely compact and lightweight, as opposed to the bench-top size devices currently used To increase the measurement range of the wavelength detector, long-wavelength and short-wavelength pass filters with a tunable center frequency can be used in place of the fixed wavelength filters shown in FIG. 4. This allows the measurement range to be shifted to different portions of the wavelength spectrum while keeping measurement accuracy. For example, suppose that the measurement range was 1 nm and the accuracy was 1 pm centered at 1550 nm. By using tunable filters, the measurement range of 1 nm could be shifted to any desirable center frequency while retaining measurement accuracy.

Figure 14:
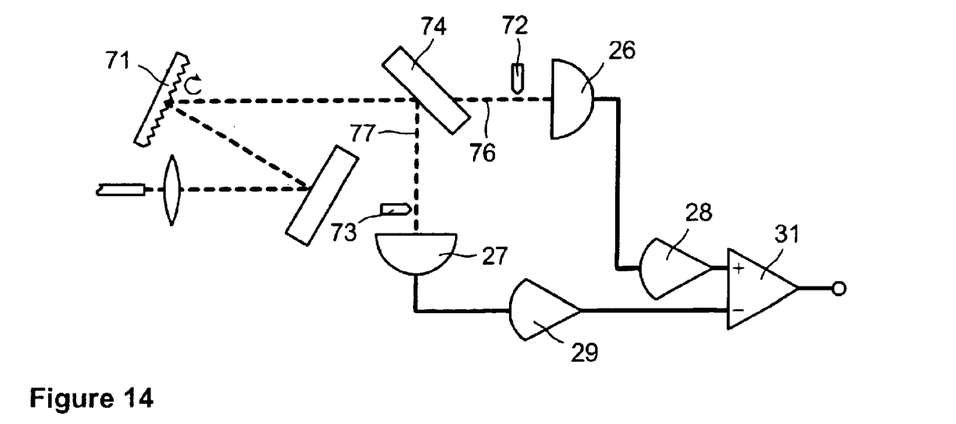
FIG. 14 is a schematic diagram of a narrow-band widely tunable wavelength detector using a diffraction grating.

Implementation can be done by using a diffraction grating 71 and apertures 72, 73 as shown in FIG. 14. A standard grating monochromator is provided with a beamsplitter 74 so that it has two output beams 76, 77 instead of one. Slits 72, 73 in front of the photodetectors 26, 27 act like an optical filter with a Gaussian or Lorentzian response. If the readouts are half-slits as shown in FIG. 14, they act like long-wave pass and short-wave pass filters, allowing duplication of the operation of FIG. 7. In operation, the device may use fixed slits and a rotating grating that moves to a fixed setting at a known wavelength. Operation at many different wavelengths is obtained by rotating the grating.

Figure 15:
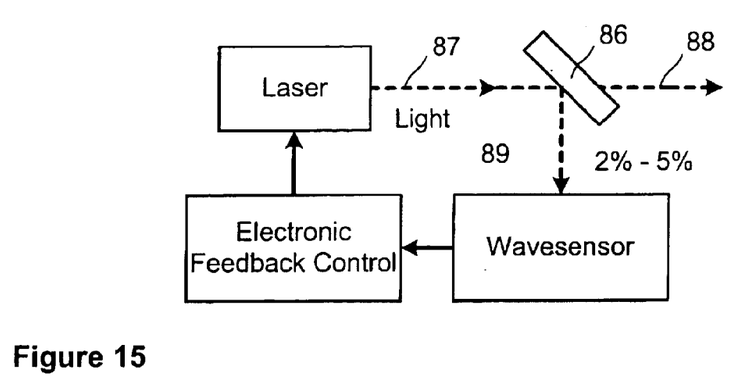
FIG. 15 is a schematic diagram of wavelength locking of lasers and other light sources using a wavelength detector in accordance with the present invention.

As described above, the wavelength detector can be used as a separate component or be integrated into a laser assembly to provide feedback signals to control the laser wavelength. Such an arrangement is schematically illustrated in FIG. 15, in which a beam splitter 86 receives the laser beam 87 and diverts a portion 88 to associated equipment. The wavelength is controlled by detecting a portion 89 with a wavelength detector in accordance with any embodiment of the present invention and providing the output signal representing wavelengths to an electronic feedback circuit 91 which controls the frequency of the laser 87.

Figure 16:
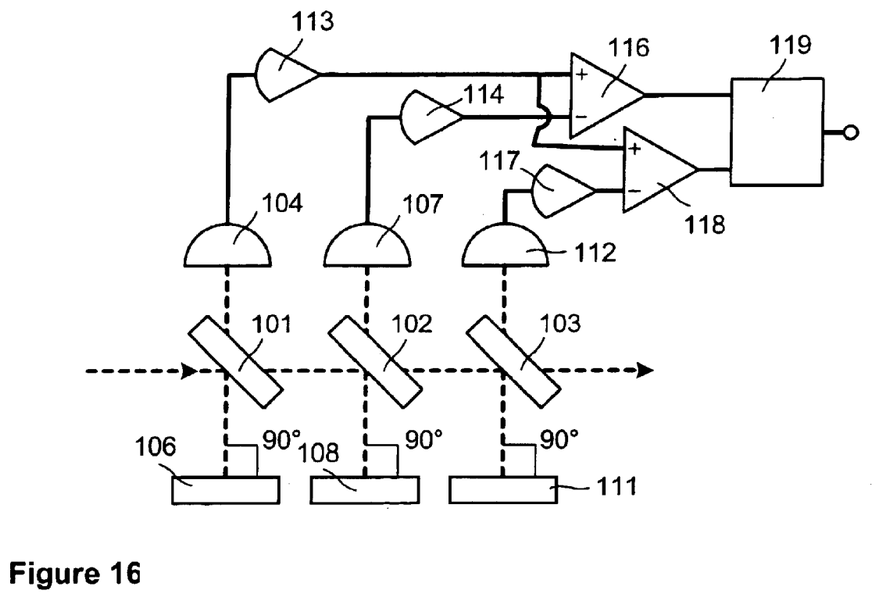
FIG. 16 is a schematic diagram showing a three-detector version of the wavelength detector for non-monochromic light detection.

FIG. 16 shows an opto-electronic system for detecting non-monochromicity of an optical signal. The system uses three beamsplitters 101, 102, 103 in the configuration of FIG. 11. The system essentially comprises two wavelength detectors of the type shown in FIG. 4, one comprised of beamsplitter 101, photodiode 104 and short-wavelength pass filter 106, and beamsplitter 102, photodiode 107 and long-wavelength pass filter 108, the other consisting of beamsplitter 101, photodiode 104 and short-wavelength pass filter 106, and beamsplitter 103, photodiode 112 and another long-wavelength pass filter 111. The combination of log amplifiers 113 and 114 and subtractor 116 provide a first output indicative of wavelength, and the combination of log amplifiers 113 and 117 and subtractor 118 provide a second output indicative of wavelength. When a single monochromatic wavelength input light signal is introduced, both wavelength detectors read out the same wavelength and the comparator 119 so indicates. When a non-monochromatic signal is introduced, the two wavelength detectors each give false readings of the wavelength and the two false readings differ, the comparator 119 signals non-monochromatic light signal.

Thus, there has been described a wavelength detector which is inexpensive, can be miniaturized and which accurately measures wavelength without having to know the approximate wavelength in advance. The wavelength detector can be used to lock the wavelength output of an optical source and it can be used to measure wavelength fluctuations in an optical source.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A wavelength detector for detecting the wavelength of an incident optical signal comprising:
   means for receiving the incident optical signal and dividing it into two paths in at least one of which the intensity of the optical signal varies with wavelength,
   photodetectors for receiving the optical signal in each of said paths and providing an output electrical signal representative of the intensity of the optical signal in each of said paths,
   log circuits for receiving the output electrical signals and providing the log of such signals, and
   a subtracting circuit for receiving the log of said output signals and providing an output indicative of the wavelength of the incident optical signal.

2. A wavelength detector as in claim 1 in which said means for receiving the incident optical signal and dividing it into two paths comprises a beamsplitter in which the intensity of the optical energy in each path varies with wavelength.

3. A wavelength detector as in claim 1 which comprises a beamsplitter which divides the incident optical signal into two paths and a wavelength sensitive filter for receiving the optical signal in at least one of said paths and passing or reflecting the optical signal so that the intensity of the optical energy in said path varies with wavelength.

4. A wavelength detector as in claim 1 which comprises a beamsplitter which divides the incident optical signal into two paths and a long-wavelength sensitive filter in one of said paths and a short-wavelength sensitive filter in the other of said paths, each passing or reflecting the optical signal in the path so that the intensity of the optical signal in each of said paths varies with wavelength.

5. A wavelength detector as in claim 1 in which said means for receiving the incident optical signal and dividing it into two paths comprises a beamsplitter in which the intensity of the optical energy in each path varies with wavelength.

6. A wavelength detector as in claim 5 which comprises a beamsplitter which divides the incident optical signal into two paths and a wavelength-sensitive filter for receiving the optical signal in at least one of said paths and passing or reflecting the optical signal so that the intensity of the optical energy in said path varies with wavelength.

7. A wavelength detector as in claim 5 which comprises a beamsplitter which divides the incident optical signal into two paths and a long-wavelength sensitive filter in one of said paths and a short-wavelength sensitive filter in the other of said paths each passing or reflecting the optical signal in the path so that the intensity of the optical signal in each of said paths varies with wavelength.

8. A polarization-insensitive wavelength detector for detecting the wavelength of an incident optical signal comprising:
   a beamsplitter which divides the incident optical signal into two paths,
   first and second long-wavelength sensitive filters connected in tandem in planes perpendicular to one another in one of said paths so that the intensity of the optical signal in said path varies with wavelength, but not with polarization,
   first and second short-wavelength sensitive filters connected in tandem in plane perpendicular to one another in the other of said paths so that the intensity of the optical signal in said path varies with wavelength, but not with polarization,
   photodetectors for receiving the optical signals in each of said paths and providing an output electrical signal representative of intensity of the optical signal in each of said paths, log circuits for receiving the output electrical signals and providing a log of such signals, and
   a subtracting circuit for receiving the log of said output signals said providing an output indicative of the wavelength of the incident optical signal.

9. A polarization-insensitive wavelength detector for detecting the wavelength of an incident optical signal comprising:
   a polarization-sensitive beamsplitter for receiving the optical signal and splitting it into two paths having different polarization,
   an individual wavelength detector in each of said paths for receiving the optical energy in its path, said individual wavelength detectors each comprising:
   means for receiving the incident polarized optical signal and dividing it into additional two paths in at least one of which the intensity of the optical signal varies with wavelength,
   photodetectors for receiving the optical signal in each of said additional paths and providing an output electrical signal representative of the intensity of the optical signal in each of said additional paths,
   log circuits for receiving the output electrical signals from each of said additional paths and providing the log of such signals, and a subtracting or ratio circuit for receiving the log of said output signals and providing an output indicative of the wavelength of the incident polarized optical signal.

10. A polarization-insensitive wavelength detector as in claim 9 in which said means for receiving the incident polarized optical signal and dividing it into two paths comprises a beamsplitter in which the intensity of the optical energy in each additional path varies with wavelength.

11. A polarization-insensitive wavelength detector as in claim 9, which comprises a beamsplitter which divides the incident optical signal into two paths and a wavelength-sensitive filter for receiving the optical signal in at least one of said additional paths, and passing or reflecting the optical signal so that the intensity of the optical energy in said path varies with wavelength.

12. A polarization-insensitive wavelength detector as in claim 9 which comprises a beamsplitter which divides the incident optical signal into two paths and a long-wavelength sensitive filter in one of said additional paths and a short-wavelength sensitive filer in the other of said additional paths each passing or reflecting the optical signal in the path so that the intensity of the optical signal in each of said paths varies with wavelength.

13. The method of detecting the wavelength of an incident optical signal which comprises the steps of:

dividing the optical signal into two paths in at least one of which the intensity of the beam varies with wavelength, generating electrical signals whose magnitudes are representative of the intensity of the optical signal in each of said paths, and taking the ratio of said electrical signals to provide an output signal indicative of the wavelength of the incident optical signal.

14. The method of detecting the wavelength of an incident optical signal which comprises the steps of:

dividing the optical signal into two paths in at least one of which the intensity of the beam varies with wavelength;

generating electrical signals whose magnitudes are representative of the intensity of the optical signal in each of said paths; and taking the ratio of said electrical signals by taking the logarithm of each electrical signal and then subtracting the logarithms.

15. A wavelength detector for detecting the wavelength of an incident optical signal comprising:

means for receiving the incident optical signal and dividing it into at least two paths in one of which the intensity of the optical signal varies with wavelength, photodetectors for receiving the optical signal in each of said paths and providing an output electrical signal representative of the intensity of the optical signal in each of said paths, and a ratio circuit for receiving the electrical signals and providing an electrical readout independent of the input signal intensity representative of the wavelength of the incident optical energy.

* * * * *